(12) United States Patent
Aggarwal et al.

(10) Patent No.: US 12,045,374 B2
(45) Date of Patent: *Jul. 23, 2024

(54) METHODS AND SYSTEMS FOR SECURELY STORING UNSTRUCTURED DATA IN A STORAGE SYSTEM

(71) Applicant: NETAPP, INC., San Jose, CA (US)

(72) Inventors: Deepti Aggarwal, Bangalore (IN); Jayanta Basak, Bangalore (IN)

(73) Assignee: NETAPP, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/980,446

(22) Filed: Nov. 3, 2022

(65) Prior Publication Data

US 2023/0066617 A1 Mar. 2, 2023

Related U.S. Application Data

(63) Continuation of application No. 17/122,892, filed on Dec. 15, 2020, now Pat. No. 11,520,929.

(51) Int. Cl.
*G06F 21/00* (2013.01)
*G06F 21/62* (2013.01)

(52) U.S. Cl.
CPC .............................. *G06F 21/6254* (2013.01)

(58) Field of Classification Search
CPC ................................................ G06F 21/6254
See application file for complete search history.

(56) References Cited

U.S. PATENT DOCUMENTS

| | | | | |
|---|---|---|---|---|
| 9,037,615 | B2* | 5/2015 | Bornea | G06F 16/901 707/803 |
| 11,520,929 | B2* | 12/2022 | Aggarwal | G06F 21/6254 |
| 2006/0136435 | A1* | 6/2006 | Nguyen | G06F 16/86 |
| 2015/0271178 | A1* | 9/2015 | Bhattacharya | G06F 21/6254 726/1 |
| 2016/0283525 | A1* | 9/2016 | Farenden | G06F 16/18 |
| 2018/0218046 | A1* | 8/2018 | Woo | G06F 16/248 |
| 2018/0302493 | A1* | 10/2018 | Borkar | H04L 67/565 |
| 2021/0263900 | A1* | 8/2021 | Joyce | G06F 16/2228 |

OTHER PUBLICATIONS

Machanavajjhala et al., "L-diversity: Privacy beyond k-anonymity", ACM Transactions on Knowledge Discovery from Data, vol. 1, Issue 1, pp. 3-es, (Mar. 2007).*

(Continued)

*Primary Examiner* — Morshed Mehedi
(74) *Attorney, Agent, or Firm* — LOZA & LOZA, LLP

(57) ABSTRACT

Methods and systems for securing unstructured data are provided. One method includes generating, by a processor, a schema from unstructured data, the schema including one or more relationships between named entities of the unstructured data; identifying, by the processor, a plurality of semantic relationships between the named entities; determining, by the processor, a sensitive relationship from the plurality of semantic relationships; and anonymizing, by the processor, sensitive data associated with the sensitive relationship by replacing, a first portion of the sensitive data with generalized information.

14 Claims, 6 Drawing Sheets

(56) References Cited

OTHER PUBLICATIONS

Alexander Y., et al., "Textrunner: Open Information Extraction on the Web," Proceedings of Human Language Technologies, 2007, pp. 2.

Amazon Macie, Amazon Web Services, retrieved from Internet [https://aws.amazon.com/macie/], printed on Dec. 15, 2020, 3 pages.

Ashwin M., et al., "I-Diversity: Privacy Beyond K-Anonymity," ACM Transactions on Knowledge Discovery from Data, 2007, vol. 1.1, pp. 36.

Aulbach S., et al., "Multi-tenant databases for software as a service: schema-mapping techniques", SIGMOD '08: Proceedings of the 2008 ACM SIGMOD international conference on Management of data, Jun. 2008, pp. 1195-1206.

Azure Information Protection, Microsoft, retrieved from Internet, [https://azure.microsoft.com/en-in/services/information-protection/], printed on Dec. 15, 2020, 4 pages.

K-Anonymization, retrieved from Internet, [https://github.com/Nuclearstar/K-Anonymity], Printed on Dec. 15, 2020, 2 pages.

NetApp, Cloud Compliance, retrieved from Internet [www.cognigo.com], printed on Dec. 15, 2020, 5 pages.

Ninghui L., et al., "T-Closeness: Privacy Beyond K-Anonymity and I-Diversity," IEEE 23rd International Conference on Data Engineering, 2007, pp. 10.

Oren E., et al., "Open Information Extraction from the Web," Communications of the ACM, 2008, vol. 51(12), pp. 7.

Pierangela S., et al.,"Protecting Privacy When Disclosing Information: K-Anonymity and its Enforcement Through Generalization and Suppression," Harvard Data Privacy Lab, 1998, pp. 19.

SpaCy Industrial-Strength Natural Language Processing, retrieved from Internet; [https://spacy.io] Printed on Dec. 15, 2020, 4 pages.

Synalp/NER, retrieved from Internet, [https://github.com/synalp/NER/tree/master/corpus/CoNLL-2003], Printed on Dec. 15, 2020, 1 page.

Terrovitis M., et al., "Anonymity in Unstructured Data," HKU CS Tech Report TR-2008-04, 21 pages.

WordNet, A Lexical Database of English, retrieved from Internet, [https://wordnet.princeton.edu], Printed on Dec. 15, 2020, 2 pages.

* cited by examiner

METHODS AND SYSTEMS FOR SECURELY STORING UNSTRUCTURED DATA IN A STORAGE SYSTEM

CROSS-REFERENCE TO RELATED APPLICATIONS

This patent application claims priority of and is a continuation of U.S. patent application Ser. No. 17/122,892, filed on Dec. 15, 2020, the disclosure of which is incorporated herein by reference in its entirety.

TECHNICAL FIELD

The present disclosure relates to securing electronic information, and more particularly, to securing sensitive information within unstructured, electronic data.

BACKGROUND

Electronic information continues to be produced extensively by various organizations. International Data Corporation estimates that by 2025 worldwide electronic data will be about 163 ZB (Zetabytes), where 1 ZB is equal to 1,000,000,000,000,000,000,000 bytes. A large portion of electronic information is unstructured. Unstructured data includes information that either does not have a pre-defined data model or is not organized in a pre-defined manner. Unstructured data may include personal data collected due to rapid growth of e-commerce, web pages that are mined by companies like Alphabet Inc. [without derogation of any third-party trademark rights), social media posts, as well as growing email archives.

The increase in unstructured data presents challenges for enterprises to securely store unstructured data because very little is "known" about the data. Furthermore, securing sensitive data continues to be challenging due to stringent compliance regulations around data privacy and heightened security requirements due to data threats including ransomwares, identity theft and leak of sensitive information, etc.

Users today demand appropriate protection and handling of their sensitive information and are wary of storing data otherwise. Conventional approach to securing personal information simply involves masking all sensitive data. This approach has shortcomings because the unstructured data then becomes unavailable for analytical or any other purpose. Continuous efforts are being made to develop computing technology that can evaluate unstructured data, understand the relationships between named entities within unstructured data and then securely store the unstructured data.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

Figure 1:
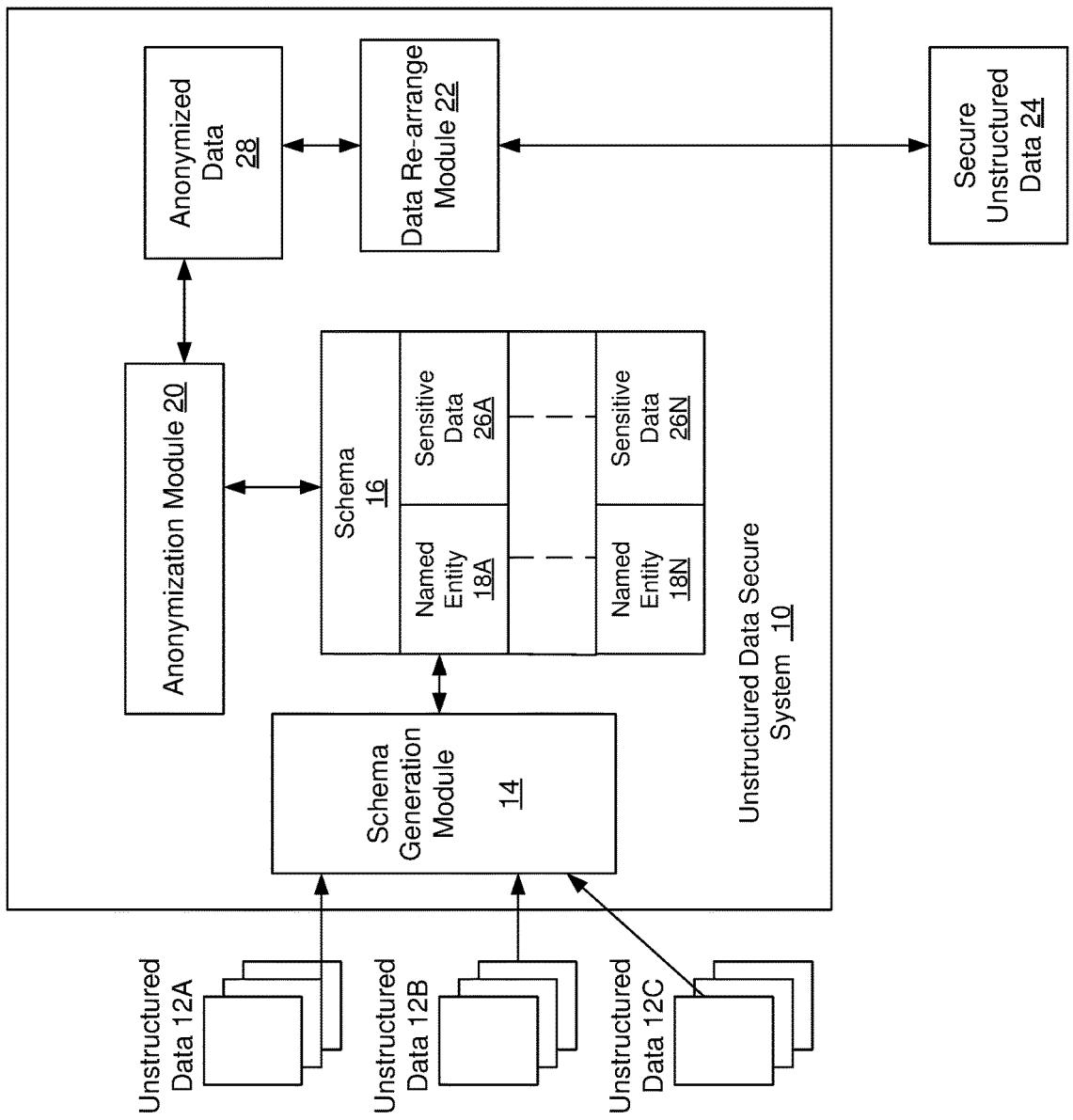
FIG. 1 shows an example of a system for securing unstructured data, according to one aspect of the present disclosure.

In one aspect, innovative technology is disclosed to evaluate unstructured data, generate a schema from the unstructured data, identify sensitive information in the schema, anonymize the sensitive information by generalizing a portion of the sensitive information and suppressing another portion of the sensitive information. The technology is automated and enables secure, mass storage of unstructured data that may include sensitive personal information.

In one aspect, the disclosed technology uses data anonymization for securely storing sensitive information in unstructured data. The data anonymization masks the sensitive information while leaving the unmasked information available.

The innovative technology disclosed herein receives unstructured data. The technology extracts relationships between named entities in the unstructured data and identifies sensitive information that needs to be protected. For example, in a sentence "Diana was born on March $25^{th}$", the relationship "DateofBirth" associated with "Diana" is extracted to protect Diana's information. Using the extracted information, a schema with a relational structure is generated identifying sensitive information and corresponding named entities.

In one aspect, a portion of the sensitive information in the schema, referred to as "quasi attributes" are generalized. Another portion of the sensitive information can be suppressed, as described below in detail. Using the generalized information and the suppressed information, the unstructured data is stored securely where the sensitive information cannot easily be discerned. Details regarding the innovative technology of the present disclosure are provided below.

As preliminary note, the terms "component", "module", "system," and the like as used herein are intended to refer to a computer-related entity, either software-executing general-purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, non-volatile storage media, solid state storage devices, storage class memory, an ASIC (application specific integrated circuit), CD (compact disc), DVD (digital video disk), ROM (read only memory), floppy disk, hard drives, EEPROM (electrically erasable programmable read only memory), or any other storage device type, in accordance with the claimed subject matter.

Data Secure System 10: FIG. 1 shows a block diagram of a data secure module 10 (may also be referred to as "system 10") with a schema generation module 14 (may also be referred to as "module 14"), an anonymization module 20 (may also be referred to as "module 20") and a data re-arrange module 22 (may also be referred to as "module 22") that stores unstructured data 12A-12C (may also be referred to as "unstructured data 12") securely, as secured unstructured data 24, according to one aspect of the present disclosure. The various modules of system 10 can be implemented by processor executable instructions in software, hardware or a combination thereof. The various modules of FIG. 1 may also be integrated into a single structure or more than the number of structures shown in FIG. 1.

In one aspect, unstructured data 12 is provided to module 14. The unstructured data 12 can be received from one or more sources including e-commerce sites, electronic documents or any other source. Module 14 extracts semantics relationships between named entities that may be included in the unstructured data. The relationships can be represented as a relationship tuple "r" (Arg1, Arg 2). In one aspect, the relationships are extracted based on unsupervised natural language processing techniques, for example, "part of speech" ("PoS") based relationship extraction techniques. It is noteworthy that any technique can be used to extract the relationships. As an example, module 14 extracts verb-based relationships between named entities of unstructured data 12.

Module 14 generates a schema 16 with the extracted relationship tuples. As an example, schema 16 includes named entities 18A-18N (may also be referred to as named entity or named entities 18) that are associated with sensitive data 26A-26N (may also be referred to as sensitive data 26). In one aspect, schema 16 is a relational structure e.g. a schematic relational structure (e.g. a table), where the named entities and the associated sensitive data are stored as relationship tuples (Arg1, Arg 2). For example, if the relationship information involves the name of a person (e.g. Susan) and a location (e.g. Irvine) where the person may be born, then schema 16 includes: Arg1_Person (Susan) and Arg_Location (Irvine) and so forth.

In one aspect, after schema 16 is generated, module 20 identifies quasi-attributes that need to be anonymized in schema 16. Anonymization assumes that it may not be enough to simply mask a sensitive attribute since other identifying attributes (or quasi-attributes) may still reveal an identity of an individual, when one is trying to protect personal identifying information. For example, if a social security number (SSN) is a sensitive attribute, then just masking the SSN may not be sufficient because a person's "Name," "date of birth," "place of birth", "place a passport was issued" may reveal an individual's identity. In this example, the attributes, name, date of birth and the place a passport was issued are referred to as quasi-attributes.

In one aspect, module 20 generalizes a portion of the sensitive information in schema 16 and suppresses another portion of the sensitive information. The anonymized data 28 is used by module 22 that takes the original unstructured data 12 and stores it as secured unstructured data 24 where certain portions of sensitive information in the unstructured data is generalized, while other portions are suppressed. Details regarding generalizing and suppressing sensitive information are provided below.

Figure 2:
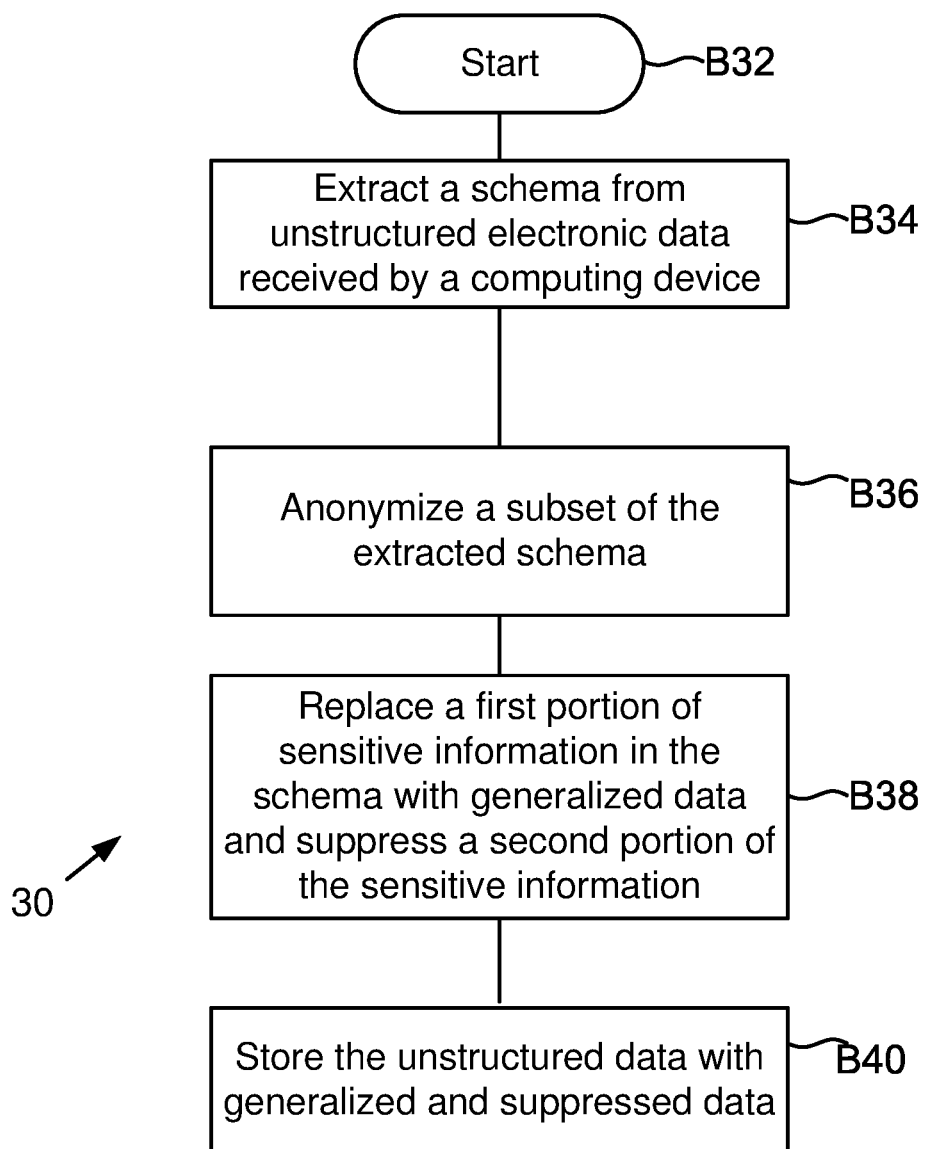
FIG. 2 shows an example of a high-level process for securing unstructured data, according to one aspect of the present disclosure.

Process Flows: FIG. 2 shows an overall process 30 for securing sensitive information in unstructured data, according to one aspect of the present disclosure. Process 30 begins in block B32, when system 10 receives unstructured data 12 from one or more sources. The unstructured data may include sensitive information that can identify a specific individual or entity or any other information that may need to be protected.

In block B34, based on the unstructured data 12, schema 16 is generated by module 14 that stores named entities 18 and associated sensitive data 26 (see FIG. 1). In block B36, sensitive information is anonymized by module 20. In block B38, a first portion of the sensitive information is replaced by generalized information from anonymized data 28, while a second portion is suppressed. In block B40, the unstructured data with the generalized information and the suppressed portion are stored as secured unstructured data 24.

Figure 3:
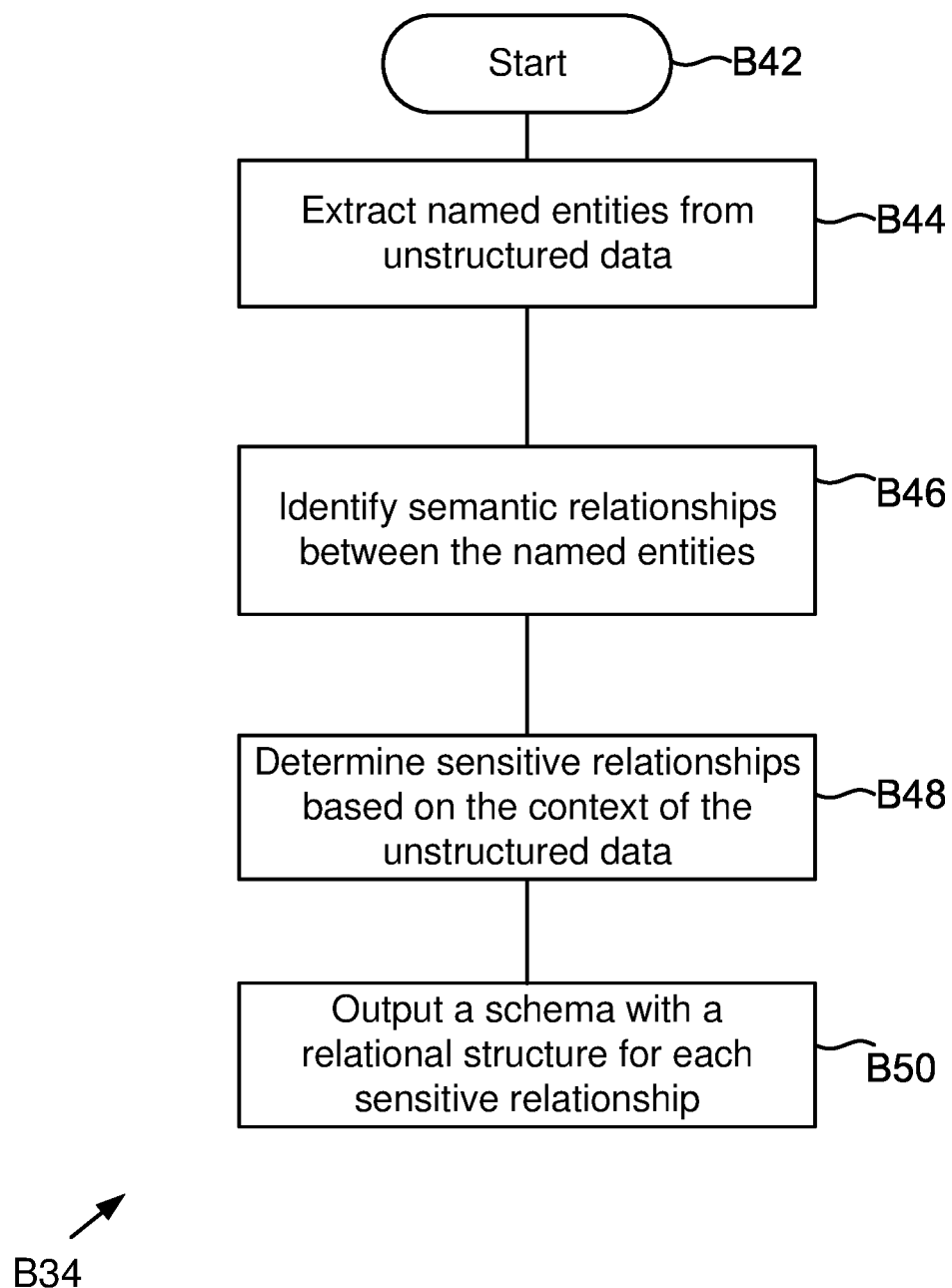
FIG. 3 shows an example of a process for generating a schema from unstructured data, according to one aspect of the present disclosure.

FIG. 3 shows details of block B34 for generating schema 16, according to one aspect of the present disclosure. The process begins in block B42. In block B44, named entities are extracted from unstructured data 12 by module 14. In block B46, semantic relationships are determined between the named entities.

Different techniques may be used to determine the relationships. For example, "REVERB" is one technique that can be used by module 14 to extract the relationships with an arity of two i.e. relationships in the form "relation" (Arg 1, Arg2). This imposes syntactic and lexical constraints on the relationship as illustrated below:

| V \| V P \| V W* P |
|---|
| V = verb particle? adv? |
| W = (noun \| adj \| adv \| pron \| det) |
| P = (prep \| particle \| inf. marker) |

Under the syntactic constraint, the relation phrase matches the part of speech (POS) tag pattern shown above. The pattern limits relation phrases to be either a verb (e.g., invented), a verb followed immediately by a preposition (e.g., located in), or a verb followed by nouns, adjectives, or adverbs ending in a preposition (e.g., has atomic weight of). If there are multiple possible matches in a sentence for a single verb, the longest possible match is chosen. Finally, if the pattern matches multiple adjacent sequences, they are merged into a single relation phrase.

The POS pattern can match highly specific uninformative relation phrases. To handle that limitation, a lexical constraint is used to separate valid relation phrases from overspecified relational phrases. The lexical constraint is intuitive based on a presumption that a valid relational phrase should take many distinct arguments in a large corpus of unstructured data 12.

In one aspect, module 14 tags the unstructured data 12 with POS tags generated from a natural language processing ("NLP") library e.g. a "Spacy" open-source python library. The adaptive aspects of the present disclosure are of course not limited to any specific library. The relation phrases are then extracted using the REVERB syntactic constraint described above. Thereafter, the arguments, Arg1 and Arg2 are extracted for each relational phrase. The nearest noun phrase x to the left of the relational phrase "r" in a sentence such that x is not a relative pronoun, WHO-adverb, or existential "there" is "Arg1". The nearest noun phrase "y" to the right of "r" is identified as "Arg2". If an (x, y) pair is found in unstructured data 12, "r(x,y)" is extracted as a relation.

Thereafter, depending on the overall context of the unstructured data, sensitive relationships are determined by module 14 in block B48. In one aspect, the sensitive information is identified based on sensitive and quasi-attributes, defined below. The sensitive relationships are extracted from a list of all possible relationships. For example, for a "personal identifying information" category, "DATE_OF_BIRTH, a list of relationships may include verbs "born" and "celebrate". From the extracted relationships, module 14 selects the relationships that may include the verb "born."

In block B50, the schema 16 is generated indicating a named entity and an associated sensitive relationship. Module 14 superposes named entity tags and annotated tags on the relationships represented by: "r(arg1, arg2)." These entity tags are used to build the schema 16 around a relationship. The schema 16 includes the various attributes in a relational structure that can be represented, for example, as [PERSON_Arg1, PERSON_Arg2, LOCATION_Arg1, LOCATION_Arg2], [PERSON_Arg1, PERSON_Arg2, Date of Birth_Arg1, Date of Birth_Arg2] and so forth. The schema 16 is then used for anonymization described in detail with respect FIG. 4.

Figure 4:
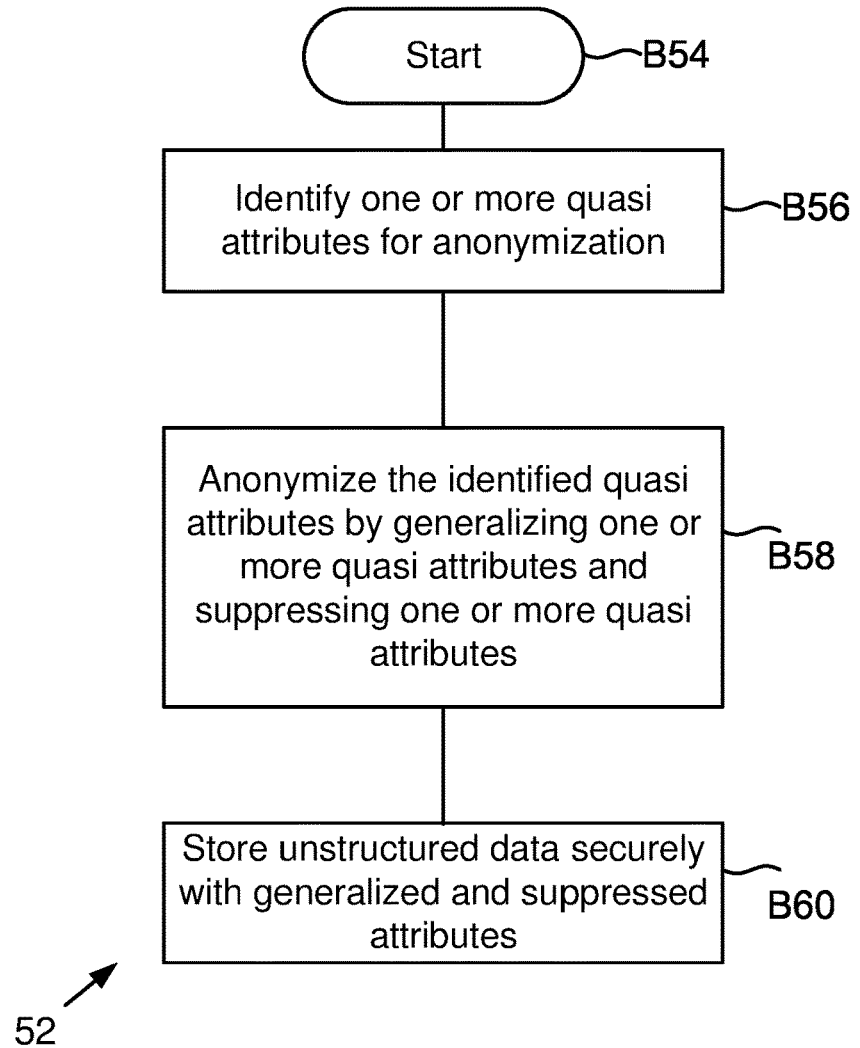
FIG. 4 shows an example of a process for anonymizing portions of data within unstructured data and securely storing the unstructured data with the anonymized portions, according to one aspect of the present disclosure.

FIG. 4 shows a process 52 that includes anonymization by module 20 and storage by module 22, according to one aspect of the present disclosure. The process begins in block B54, after schema 16 has been generated. In block B56, one or more quasi-attributes are identified for anonymization. A quasi attribute is defined as:

For a given population U, a person-specific table $PT(A_1, \ldots, A_n)$, $f_c: U \rightarrow PT$ and $f_g: PT \rightarrow U'$, where $U \subseteq U'$. A quasi-identifier of PT, written $Q_{PT}$, is a set of attributes $A_i, \ldots A_j \subseteq A_1, \ldots A_n$ where $\exists p_i \in U$ such that $f_g(f_c(p_i)[Q_{PT}]) = p_i$.

As an example, a quasi-attribute for a person specific table (PT) (i.e. a table that identifies a person uniquely) is a set of attributes in the PT that can be used to externally link or identify a given tuple.

In block B58, a portion of the sensitive information or one or more quasi attributes are anonymized by module 20. In one aspect, module 20 executing processor executable instructions uses a "K-Anonymization" technique to anonymize sensitive information. In conventional systems, K-Anonymization is only used for anonymizing structured information, unlike the innovative technology disclosed herein, where it is used for unstructured data. K-Anonymization is based on a K-Anonymity method for providing privacy protection by ensuring that data cannot be traced to an individual. In a K-Anonymous dataset, any identifying information occurs in at least k tuples based on the following definition of k-anonymity:

Let RT $(A_1, \ldots, A_n)$ be a table and QRT be the quasi-identifier associated with it. RT is said to satisfy k-anonymity if and only if each sequence of values in RT $[Q_{RT}]$ appears at least k times in RT $[Q_{RT}]$.

In one aspect, module 20 generalizes one or more quasi attributes and suppresses one or more attributes for generating the anonymized data 28. For generalization, individual attributes are replaced with a broader category. For example, a person's specific Age (26) is replaced by an age range Age: (20-30). In case of categorical attributes, individual attributes are replaced with set of aggregated values. For suppression, individual quasi attributes are replaced by *** or any other symbols.

In a K-Anonymized dataset, there is a 1/k chance of being able to correctly identify the identity of an individual. As 'k' gets larger, the anonymity of the dataset grows stronger. By enforcing that sensitive datasets achieve K-anonymity with a large value of 'k', the risk of uncovering the identity of an individual is minimized while still allowing the data to be practically useful for analytic or other applications.

Thereafter, the unstructured data is stored securely in block B64 as secured unstructured data 24. In secured unstructured data 24, a portion of the unstructured data includes generalized attributes, as well as suppressed attributes. This enables an enterprise to automate securing unstructured data. This enables an enterprise to protect individual identity and comply with regulatory requirements for handling data and maintaining privacy.

In one aspect, methods and systems for securing unstructured data are provided. One method includes generating, by a processor, a schema from unstructured data, the schema including one or more relationships between named entities of the unstructured data; identifying, by the processor, a plurality of semantic relationships between the named entities; determining, by the processor, a sensitive relationship from the plurality of semantic relationships; and anonymizing, by the processor, sensitive data associated with the sensitive relationship by replacing, a first portion of the sensitive data with generalized information.

In yet another aspect, a non-transitory, machine readable storage medium having stored thereon instructions for performing a method for securing unstructured data is provided. The storage medium includes machine executable code which when executed by at least one machine, causes the machine to: identify one or more relationships between named entities of the unstructured data; determine a plurality of semantic relationships between the named entities; select a sensitive relationship from the plurality of semantic relationships; and anonymize sensitive data associated with the sensitive relationship by replacing, a first portion of the sensitive data with generalized information.

Figure 5:
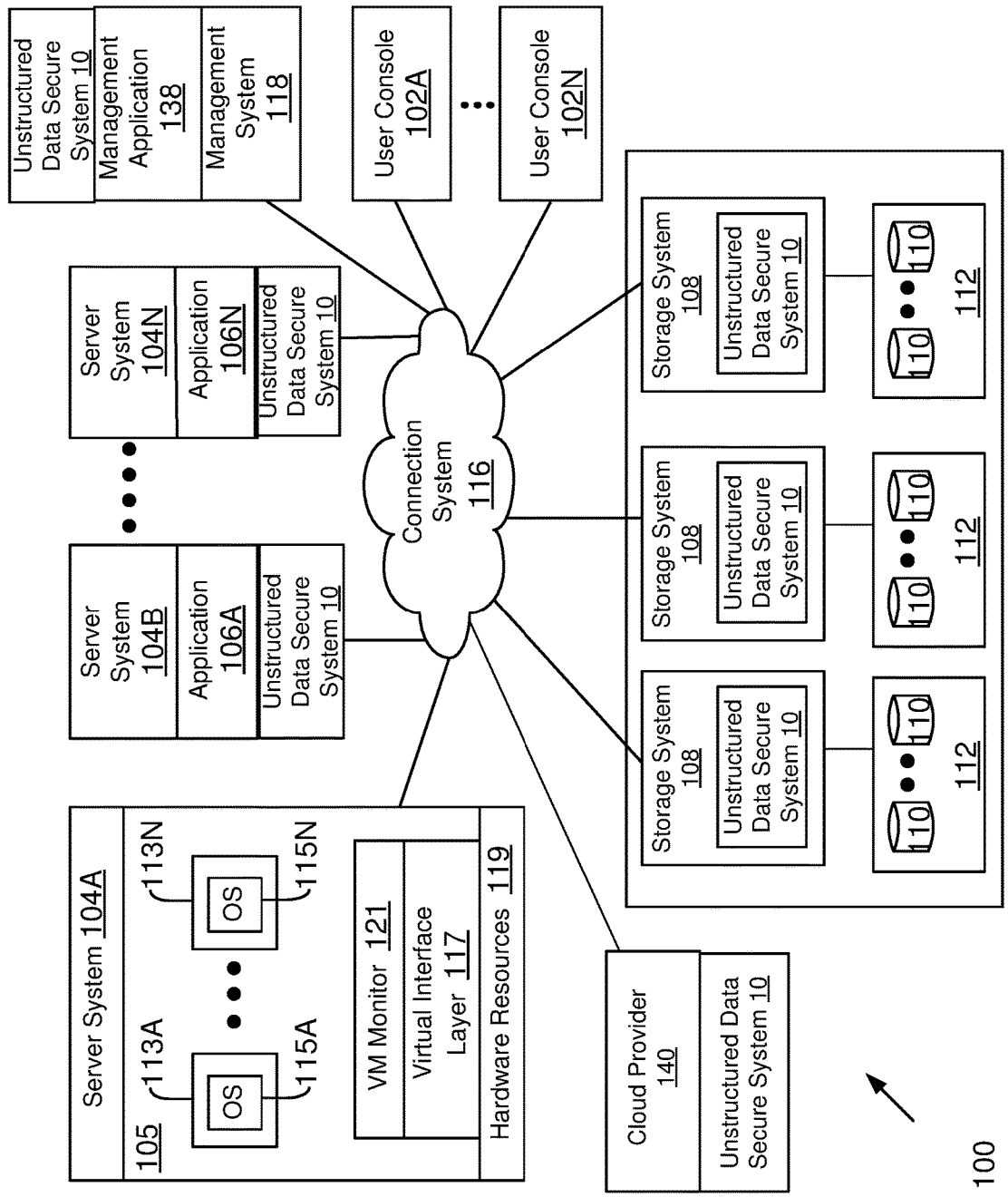
FIG. 5 shows an example of a networked storage environment for securely storing unstructured data, according to one aspect of the present disclosure.

System 100: FIG. 5 shows an example of a networked operating environment 100 (also referred to as "system 100"), for implementing the various adaptive aspects of the present disclosure. In one aspect, system 10 can be used in system 100 that stores data for various enterprises and may include sensitive information. System 10 can be deployed in various segments of system 100, as described below in detail.

In one aspect, system 100 may include a plurality of computing systems 104A-104N (may also be referred to and shown as server system (or server systems) 104 or as host system (or host systems) 104) that may access one or more storage systems 108 via a connection system 116 such as a local area network (LAN), wide area network (WAN), the Internet and others. The server systems 104 may communicate with each other via connection system 116, for example, for working collectively to provide data-access service to user consoles (or computing devices) 102A-102N (may be referred to as user 102 or client system 102). A cloud provider 140 may be used to provide storage to clients.

Server systems 104 may be computing devices configured to execute applications 106A-106N (may be referred to as application 106 or applications 106) over a variety of operating systems, including the UNIX® and Microsoft Windows® operating systems. Applications 106 may utilize data services of storage system 108 to access, store, and manage data in a set of storage devices 110 that are described below in detail. Applications 106 may include a database program, an email program or any other computer executable program. Documents and unstructured data generated by the applications are secured by system 10, as described above.

Server systems 104 generally utilize file-based access protocols when accessing information (in the form of files and directories) over a network attached storage (NAS)-based network. Alternatively, server systems 104 may use block-based access protocols, for example, the Small Computer Systems Interface (SCSI) protocol encapsulated over TCP (iSCSI) and SCSI encapsulated over Fibre Channel (FCP) to access storage via a storage area network (SAN).

Server 104A executes a virtual machine environment 105, according to one aspect. In the virtual machine environment 105, a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

The virtual machine environment 105 includes a plurality of VMs 113A-113N that execute a plurality of guest OS 115A-115N (may also be referred to as guest OS 115) to share hardware resources 119. System 10 may be executed within a VM 113 for securing unstructured data. As described above, hardware resources 119 may include CPU, memory, I/O devices, storage or any other hardware resource.

A virtual machine monitor (VMM) 121, for example, a processor executed hypervisor layer provided by VMWare Inc., Hyper-V layer provided by Microsoft Corporation (without derogation of any third party trademark rights) or any other virtualization layer type, presents and manages the plurality of guest OS 115. VMM 121 may include or interface with a virtualization layer (VIL) 117 that provides one or more virtualized hardware resource 119 to each guest OS. For example, VIL 117 presents physical storage at storage devices 110 as virtual storage (for example, as a virtual hard drive (VHD)) to VMs 113A-113N. The VMs use the VHDs to store information at storage devices 110.

In one aspect, VMM 121 is executed by server system 104A with VMs 113A-113N. In another aspect, VMM 121 may be executed by a separate stand-alone computing system, often referred to as a hypervisor server or VMM server and VMs 113A-113N are presented via another computer system. It is noteworthy that various vendors provide virtualization environments, for example, VMware Corporation, Microsoft Corporation (without derogation of any third party trademark rights) and others. The generic virtualization environment described above with respect to FIG. 5 may be customized depending on the virtual environment provider.

System 100 may also include a management system 118 for managing and configuring various elements of system 100. Management system 118 may include one or more computing systems for retrieving storage system 108 performance data and providing it to module 12 for classification. Management system 118 may also execute or include a management application 138 that processes performance data retrieved from the storage system 108. The management data is secured by system 10, as described above in detail.

In one aspect, storage system 108 is a shared storage system having access to a set of mass storage devices 110 (may be referred to as storage devices 110) within a storage subsystem 112. As an example, storage devices 110 may be a part of a storage array within the storage sub-system 112. Storage devices 110 are used by the storage system 108 for storing information including secured unstructured data 24 (FIG. 1). The storage devices 110 may include writable storage device media such as magnetic disks, video tape, optical, DVD, magnetic tape, non-volatile memory devices for example, self-encrypting drives, flash memory devices and any other similar media adapted to store information. The storage devices 110 may be organized as one or more groups of Redundant Array of Independent (or Inexpensive) Disks (RAID). The various aspects disclosed herein are not limited to any particular storage device or storage device configuration.

In one aspect, to facilitate access to storage devices 110, a storage operating system of storage system 108 "virtualizes" the storage space provided by storage devices 110. The storage system 108 can present or export data stored at storage devices 110 to server systems 104 and VMM 121 as a storage volume or one or more qtree sub-volume units including logical unit numbers (LUNs). Each storage volume may be configured to store data files (or data containers or data objects), scripts, word processing documents, executable programs, and any other type of structured or unstructured data including secured unstructured data 24. From the perspective of the VMS/server systems, each volume can appear to be a single storage device. However, each volume can represent the storage space in one storage device, an aggregate of some or all of the storage space in multiple storage devices, a RAID group, or any other suitable set of storage space.

It is noteworthy that the term "disk" as used herein is intended to mean any storage device/space and not to limit the adaptive aspects to any particular type of storage device, for example, hard disks.

The storage system 108 may be used to store and manage information at storage devices 110 based on a request generated by server system 104, management system 118, user 102 and/or a VM. The request may be based on file-based access protocols, for example, the CIFS or the NFS protocol, over TCP/IP. Alternatively, the request may use block-based access protocols, for example, iSCSI or FCP.

As an example, in a typical mode of operation, server system 104 (or VMs 113A-113N) transmits one or more input/output (I/O) commands, such as an NFS or CIFS request, over connection system 116 to the storage system 108. Storage system 108 receives the request, issues one or more I/O commands to storage devices 110 to read or write the data on behalf of the server system 104, and issues an NFS or CIFS response containing the requested data over the connection system 116 to the respective server system 104

In one aspect, storage system 108 may have a distributed architecture, for example, a cluster based system that may include a separate network module and storage module. Briefly, the network module is used to communicate with server systems 104 and management system 118, while the storage module is used to communicate with the storage devices 110.

Figure 6:
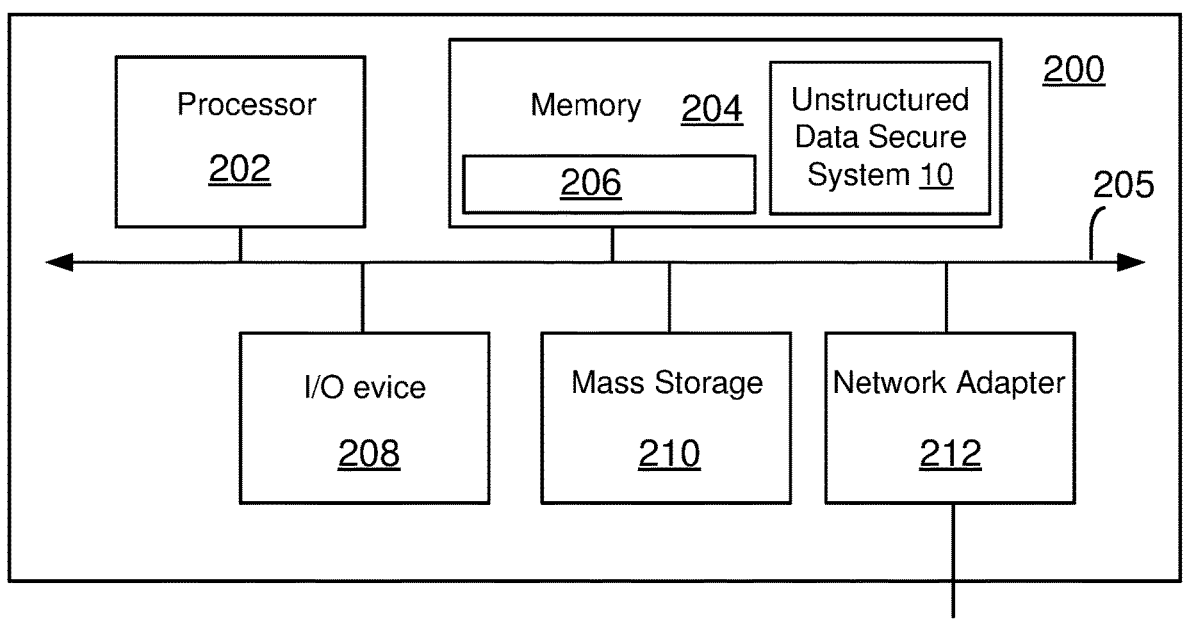
FIG. 6 shows an example of a processing system, used according to one aspect of the present disclosure.

Processing System: FIG. 6 is a high-level block diagram showing an example of the architecture of a processing system, at a high level, in which executable instructions as described above can be implemented. The processing system 200 can represent modules of system 10, management system 118, user console 102, server systems 104 and others. Note that certain standard and well-known components which are not germane to the present invention are not shown in FIG. 6.

The processing system 200 includes one or more processors 202 and memory 204, coupled to a bus system 205. The bus system 205 shown in FIG. 6 is an abstraction that represents any one or more separate physical buses and/or point-to-point connections, connected by appropriate bridges, adapters and/or controllers. The bus system 205, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 202 are the central processing units (CPUs) of the processing system 200 and, thus, control its overall operation. In certain aspects, the processors 202 accomplish this by executing programmable instructions stored in memory 204. A processor 202 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 204 represents any form of random access memory (RAM), read-only memory (ROM), flash memory, or the like, or a combination of such devices. Memory 204 includes the main memory of the processing system 200. Instructions 206 which implements techniques introduced above may reside in and may be executed (by processors 202) from memory 204. For example, instructions 206 may include code for executing the process steps of FIGS. 2-4 and system 10, respectively.

Also connected to the processors 202 through the bus system 205 are one or more internal mass storage devices 210, and a network adapter 212. Internal mass storage devices 210 may be or may include any conventional medium for storing large volumes of data in a non-volatile manner, such as one or more magnetic or optical based disks. The network adapter 212 provides the processing system 200 with the ability to communicate with remote devices (e.g., storage servers) over a network and may be, for example, an Ethernet adapter, a FC adapter, or the like. The processing system 200 also includes one or more input/output (I/O) devices 208 coupled to the bus system 205. The I/O devices 208 may include, for example, a display device, a keyboard, a mouse, etc.

Cloud Computing: The system and techniques described above are applicable and useful in the cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. System 10 and its associated processes of FIGS. 2-4 can be implanted in any layer of the cloud infrastructure.

Thus, computing technology for securing unstructured data have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:
identifying, by the processor, a first set of a plurality of semantic relationships between named entities of unstructured data, based on a first constraint type;
utilizing, by the processor, a second constraint type to identify a subset of the first set by filtering any over-specified relationships from the first set;
determining, by the processor, based on a context of the unstructured data, a sensitive relationship from the subset identifying a sensitive attribute for a named entity;
associating, by the processor, a quasi-attribute of the sensitive relationship, the quasi attribute and the sensitive attribute indicating protectable sensitive data for the named entity;
generating, by the processor, a schema associating the named entity with the sensitive data in a relational structure; and
utilizing, by the processor, the schema to anonymize the sensitive data by replacing a first portion of the sensitive data with generalized information and suppressing a second portion of the sensitive data.

2. The method of claim 1, wherein the first constraint type is a syntactic constraint.

3. The method of claim 1, wherein the second constraint type is a lexical constraint.

4. The method of claim 1, further comprising:
representing, by the processor, the named entity and the sensitive data by a relational tuple of the relational structure.

5. The method of claim 1, further comprising:
storing, by the processor, the unstructured data with the generalized information for the first portion of the sensitive data and a suppressed second portion of the sensitive data.

6. The method of claim 1, further comprising:
utilizing, by the processor, a K-anonymized dataset for anonymizing the sensitive data, based on the sensitive data occurring in at least k tuples, where a tuple represents the named entity and at least a portion of the sensitive data.

7. The method of claim 1, further comprising:
replacing, by the processor, an individual attribute included in the sensitive data by a broad category associated with the individual attribute.

8. The method of claim 1, wherein the quasi attribute for a person specific table includes one or more attributes that externally links or identifies a relationship tuple.

9. A non-transitory, machine-readable storage medium having stored thereon instructions for performing a method, comprising machine executable code which when executed by at least one machine, causes the at least one machine to:
identify a first set of a plurality of semantic relationships between named entities of unstructured data, based on a first constraint type;
utilize a second constraint type to identify a subset of the first set by filtering any over-specified relationships from the first set;
determine, based on a context of the unstructured data, a sensitive relationship from the subset identifying a sensitive attribute for a named entity;
associate a quasi-attribute of the sensitive relationship, the quasi attribute and the sensitive attribute indicating protectable sensitive data for the named entity;
generate a schema associating the named entity with the sensitive data in a relational structure; and
utilize the schema to anonymize the sensitive data by replacing a first portion of the sensitive data with generalized information and suppressing a second portion of the sensitive data.

10. The non-transitory, machine-readable storage medium of claim 9, wherein the first constraint type is a syntactic constraint, and the second constraint type is a lexical constraint.

11. The non-transitory, machine-readable storage medium of claim 6, wherein the machine executable code which when executed by the at least one machine, further causes the at least one machine to:
represent the named entity and the sensitive data by a relational tuple of the relational structure.

12. A system, comprising:
a memory containing non-transitory machine-readable storage medium comprising
machine executable code having stored thereon instructions; and
a processor configured to execute the machine executable code to:
identify a first set of a plurality of semantic relationships between named entities of unstructured data, based on a first constraint type;
utilize a second constraint type to identify a subset of the first set by filtering any over-specified relationships from the first set;
determine, based on a context of the unstructured data, a sensitive relationship from the subset identifying a sensitive attribute for a named entity;
associate a quasi-attribute of the sensitive relationship, the quasi attribute and the sensitive attribute indicating protectable sensitive data for the named entity; and
generate a schema associating the named entity with the sensitive data in a relational structure; and
utilize the schema to anonymize the sensitive data by replacing a first portion of the sensitive data with generalized information and suppressing a second portion of the sensitive data.

13. The system of claim 12, wherein the first constraint type is a syntactic constraint and the second constraint type is a lexical constraint.

14. The system of claim 12, wherein the machine executable code further causes to:
represent the named entity and the sensitive data by a relational tuple of the relational structure.

* * * * *